US012679144B2

(12) United States Patent (10) Patent No.: US 12,679,144 B2
Hayashi et al. (45) Date of Patent: Jul. 14, 2026

(54) HEAVY DUTY TIRE

(71) Applicant: Sumitomo Rubber Industries, Ltd.,
Hyogo (JP)

(72) Inventors: Shunsuke Hayashi, Kobe (JP); **Kae
Ito**, Kobe (JP)

(73) Assignee: Sumitomo Rubber Industries, Ltd.,
Hyogo (JP)

( * ) Notice: Subject to any disclaimer, the term of this
patent is extended or adjusted under 35
U.S.C. 154(b) by 0 days.

(21) Appl. No.: 19/066,389

(22) Filed: Feb. 28, 2025

(65) Prior Publication Data

US 2025/0303797 A1 Oct. 2, 2025

(30) Foreign Application Priority Data

Apr. 1, 2024 (JP) ................................. 2024-058638

(51) Int. Cl.
B60C 9/18 (2006.01)
B60C 9/20 (2006.01)
B60C 11/03 (2006.01)
*B60C 9/22* (2006.01)

(52) U.S. Cl.
CPC ................ B60C 9/20 (2013.01); B60C 11/03
(2013.01); *B60C 2009/2067* (2013.01); *B60C
2009/2219* (2013.01); *B60C 2009/2266*
(2013.01); *B60C 2011/0341* (2013.01); *B60C
2200/06* (2013.01)

(58) Field of Classification Search
CPC .................. B60C 9/1835; B60C 9/185; B60C
2009/1842; B60C 2009/1871; B60C 9/22;
B60C 2009/2219; B60C 2009/2266
See application file for complete search history.

(56) References Cited

U.S. PATENT DOCUMENTS

| | | | | |
|---|---|---|---|---|
| 4,522,243 A | * | 6/1985 | Eveque-Mourroux | ... B60C 9/26 152/531 |
| 5,385,189 A | * | 1/1995 | Aoki | ......................... B60C 1/00 152/DIG. 3 |
| 2009/0095396 A1 | * | 4/2009 | Harikae | ................ B60C 9/2006 152/527 |

FOREIGN PATENT DOCUMENTS

| | | | |
|---|---|---|---|
| JP | 2003-191712 | * | 7/2003 |
| JP | 2013-184637 | * | 9/2013 |
| JP | 2016-203684 | * | 12/2016 |
| JP | 2022-047999 A | | 3/2022 |

* cited by examiner

*Primary Examiner* — Justin R Fischer

(74) *Attorney, Agent, or Firm* — Studebaker Brackett
PLLC

(57) ABSTRACT

Provided is a heavy duty tire 2 that can suppress a decrease
in durability due to the provision of a band and can achieve
improvement of uneven wear resistance. The tire 2 includes
a reinforcing layer 20 and a tread 4. The tread 4 has shoulder
circumferential grooves 34. The reinforcing layer 20
includes a belt 52 and a band 54. The belt 52 includes an
inner belt ply 74 and an outer belt ply 76. The band 54
includes a full band 66. The full band 66 is located between
the inner belt ply 74 and the outer belt ply 76. A distance
UFc between the full band 66 and the inner belt ply 74 is
longer than a distance SFc between the full band 66 and the
outer belt ply 76 at an equator plane of the tire 2.

18 Claims, 6 Drawing Sheets

Fig. 2

HEAVY DUTY TIRE

BACKGROUND OF THE INVENTION

Field of the Invention

The present invention relates to a heavy duty tire.

Background Art

In a tire in a running state, deformation and restoration are repeated. In a heavy duty tire on which a large load acts, the profile and the ground-contact shape thereof change.

In a high-flatness tire having an aspect ratio of not less than 70%, the ground-contact shape and the profile thereof significantly change at a crown portion. The crown portion tends to be more easily worn than each shoulder portion.

The components included in a tire include a band. The band includes a band cord extending substantially in the circumferential direction. The carcass of the tire in a running state attempts to expand outward due to the action of the internal pressure of the tire and centrifugal force. The band can contribute to suppressing a radially outward dimensional change of the carcass, that is, dimensional growth of the carcass.

The adoption of a band has been considered in order to suppress changes in profile and ground-contact shape and improve uneven wear resistance (for example, Japanese Laid-Open Patent Publication No. 2022-47999).

An object of the present invention is to provide a heavy duty tire that can suppress a decrease in durability due to the provision of a band and can achieve improvement of uneven wear resistance.

SUMMARY OF THE INVENTION

A heavy duty tire according to the present invention is a heavy duty tire having a nominal aspect ratio of not less than 70%, and includes: a pair of beads; a carcass extending on and between the pair of beads; a reinforcing layer located radially outward of the carcass; and a tread covering the reinforcing layer and configured to come into contact with a road surface. The tread has a plurality of circumferential grooves extending continuously in a circumferential direction. The plurality of circumferential grooves include a shoulder circumferential groove located on each outermost side in an axial direction. The reinforcing layer includes a belt including a large number of belt cords aligned with each other, and a band including a helically wound band cord. The belt includes an inner belt ply and an outer belt ply aligned in a radial direction. A direction of inclination of the belt cords included in the inner belt ply is opposite to a direction of inclination of the belt cords included in the outer belt ply. The band includes a full band located between the inner belt ply and the outer belt ply. Ends of the inner belt ply, the outer belt ply, and the full band are located axially outward of the shoulder circumferential groove. A distance UFc between the full band and the inner belt ply is longer than a distance SFc between the full band and the outer belt ply at an equator plane of the tire.

According to the present invention, a heavy duty tire that can suppress a decrease in durability due to the provision of a band and can achieve improvement of uneven wear resistance, is obtained.

BRIEF DESCRIPTION OF THE DRAWINGS

FIG. 2 is an enlarged cross-sectional view showing a part of the tire in FIG. 1;

DETAILED DESCRIPTION

Figure 1:
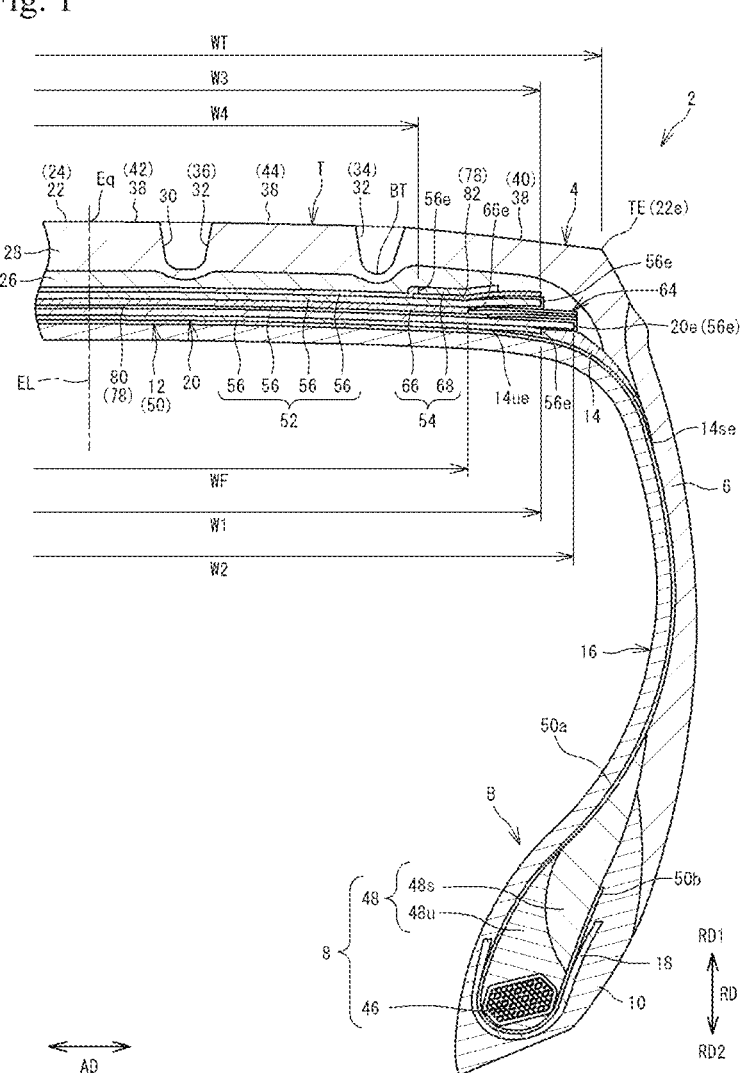
FIG. 1 is a cross-sectional view showing a part of a heavy duty tire according to one embodiment of the present invention.

Hereinafter, the present invention will be described in detail based on a preferred embodiment with appropriate reference to the drawings.

A tire of the present invention is fitted on a rim. The interior of the tire is filled with air to adjust the internal pressure of the tire. The tire fitted on the rim is also referred to as tire-rim assembly. The tire-rim assembly includes the rim and the tire fitted on the rim.

In the present invention, a state where a tire is fitted on a standardized rim, the internal pressure of the tire is adjusted to a standardized internal pressure, and no load is applied to the tire is referred to as standardized state.

In the present invention, unless otherwise specified, the dimensions and angles of each component of the tire are measured in the standardized state.

The dimensions and angles of each component in a meridian cross-section of the tire, which cannot be measured in a state where the tire is fitted on the standardized rim, are measured in a cut plane of the tire obtained by cutting the tire along a plane including a rotation axis. In this measurement, the tire is set such that the distance between right and left beads is equal to the distance between the beads in the tire that is fitted on the standardized rim. The configuration of the tire that cannot be confirmed in a state where the tire is fitted on the standardized rim is confirmed in the above-described cut plane.

The standardized rim means a rim specified in a standard on which the tire is based. The "standard rim" in the JATMA standard, the "Design Rim" in the TRA standard, and the "Measuring Rim" in the ETRTO standard are standardized rims.

The standardized internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard are standardized internal pressures.

A standardized load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are standardized loads.

In the present invention, the "nominal aspect ratio" is the "nominal aspect ratio" included in the "tire designation" specified in JIS D4202 "Automobile tyres-Designation and dimensions".

In the present invention, the number of cords included per 50 mm width of a tire component including aligned cords is represented as a cord density (unit: ends/50 mm). Unless otherwise specified, the cord density is obtained in a cross-section of the component obtained by cutting the component along a plane perpendicular to the longitudinal direction of the cords. Also, in a component including a helically wound cord, it is apparent that a plurality of cords are aligned, and thus a cord density is obtained in the same manner as the tire component including aligned cords.

In the present invention, a crosslinked rubber is obtained by pressurizing and heating a rubber composition. The crosslinked rubber is a crosslinked product of the rubber composition. The rubber composition is a material obtained by mixing a raw material rubber component and chemicals in a kneading machine such as a Banbury mixer. The raw material rubber component is crosslinked in the crosslinked rubber, but the raw material rubber component is not crosslinked in the rubber composition. The crosslinked rubber is also referred to as vulcanized rubber, and the rubber composition is also referred to as unvulcanized rubber.

Examples of the raw material rubber component include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oil, fillers such as zinc oxide, lubricants such as stearic acid, antioxidants, processing aids, sulfur, and vulcanization accelerators. Selection of a raw material rubber component and chemicals, the amounts of the selected chemicals, etc., are determined as appropriate according to the specifications of components, such as a tread and a sidewall, for which the rubber composition is used.

In the present invention, a loss tangent (tan δ) of a component formed from a crosslinked rubber, of the components included in the tire, is measured using a viscoelasticity spectrometer according to the standards of JIS K6394. The measurement conditions are as follows.

Initial strain=10%
  Dynamic strain=±1%
  Frequency=10 Hz
  Mode=stretch mode
  Temperature=70° C.

In this measurement, a test piece (40 mm long×4 mm wide×1 mm thick) is sampled from the tire. The length direction of the test piece is caused to coincide with the circumferential direction of the tire. When a test piece cannot be sampled from the tire, a test piece is sampled from a sheet-shaped crosslinked rubber (hereinafter, also referred to as rubber sheet) obtained by pressurizing and heating a rubber composition, which is used for forming the component to be measured, at a temperature of 170° C. for 12 minutes.

In the present invention, the loss tangent is represented as a loss tangent at 70° C.

In the present invention, a stress at 200% elongation of a component formed from a crosslinked rubber, of the components included in the tire, is measured according to the standards of JIS K6251 (measurement for determining a tensile stress at a specified elongation). The stress at 200% elongation is also referred to as 200% modulus.

In the present invention, a tread portion of the tire is a portion of the tire that comes into contact with a road surface. A bead portion is a portion of the tire that is fitted to a rim. A sidewall portion is a portion of the tire that extends between the tread portion and the bead portion. The tire includes a tread portion, a pair of bead portions, and a pair of sidewall portions as portions thereof.

A center portion of the tread portion is also referred to as crown portion. A portion of the tread portion at each end thereof is also referred to as shoulder portion.

[Findings on which Present Invention is Based]

A belt includes a plurality of belt plies aligned in the radial direction. In order to suppress changes in profile and ground-contact shape, in the case where a band, specifically a full band, is combined with the belt to form a reinforcing layer, the full band is stacked on the belt ply.

The full band includes a helically wound band cord. Meanwhile, each belt ply includes a large number of belt cords aligned with each other. The respective belt cords are independent of each other. The resistance of each belt ply to dimensional growth of a carcass is lower than that of the full band.

The shape of each belt ply tends to change in response to dimensional growth. The change in the shape of each belt ply is accompanied by a change in the inclination angle of the belt cords. Strain is likely to be generated between the band cord and the belt cords.

As described above, the carcass of a tire in a running state attempts to expand outward due to the action of the internal pressure of the tire and centrifugal force. In the case where a full band is stacked on a belt ply, the distance between the full band and the belt ply, in other words, the distance between a band cord and belt cords, is expected to gradually decrease. In particular, in the case where a full band is interposed between two belt plies aligned in the radial direction, the distance between the band cord of the full band and the belt cords of the belt ply located on the inner side of the full band is expected to decrease significantly compared to the distance between the band cord and the belt cords of the belt ply located on the outer side of the full band.

In a high-flatness tire, the action of the tire internal pressure is stronger at a crown portion and is weaker at each shoulder portion. Thus, dimensional growth of the crown portion is promoted. In the high-flatness tire, the distance between a band cord and belt cords is expected to decrease at the crown portion to increase strain generated between the band cord and the belt cords.

If the distance between the band cord and the belt cords is insufficient, contact between the band cord and the belt cords may occur, and depending on the degree of contact, the adhesion strength between the full band and the belt ply may decrease, or the strength of the band cord or the belt cords may decrease. The decrease in the adhesion strength and the decrease in the strength of the cords influence the durability of the tire. In this case, even though the band is adopted in order to suppress changes in profile and ground-contact shape and improve uneven wear resistance, the band cannot sufficiently exhibit its function.

Therefore, the present inventor has conducted a thorough study by focusing on the distance between a full band and a belt ply in order to suppress a decrease in durability due to the provision of the band and improve uneven wear resistance, and thus has completed the present invention described below.

Outline of Embodiment of Present Invention

The present invention is directed to a heavy duty tire having a nominal aspect ratio of not less than 70%, the tire including: a pair of beads; a carcass extending on and between the pair of beads; a reinforcing layer located radially outward of the carcass; and a tread covering the reinforcing layer and configured to come into contact with a road surface, wherein the tread has a plurality of circumferential grooves extending continuously in a circumferential direction, the plurality of circumferential grooves include a shoulder circumferential groove located on each outermost side in an axial direction, the reinforcing layer includes a belt including a large number of belt cords aligned with each other, and a band including a helically wound band cord, the belt includes an inner belt ply and an outer belt ply aligned in a radial direction, a direction of inclination of the belt cords included in the inner belt ply is opposite to a direction of inclination of the belt cords included in the outer belt ply, the band includes a full band located between the inner belt ply and the outer belt ply, ends of the inner belt ply, the outer belt ply, and the full band are located axially outward of the shoulder circumferential groove, and a distance UFc between the full band and the inner belt ply is longer than a distance SFc between the full band and the outer belt ply at an equator plane of the tire.

The heavy duty tire of the present invention can suppress a decrease in durability due to the provision of the band and can achieve improvement of uneven wear resistance. The mechanism by which this effect is achieved has not been clarified, but is inferred as follows.

The full band located between the inner belt ply and the outer belt ply suppresses changes in profile and ground-contact shape. The full band can contribute to improving uneven wear resistance.

Since the distance between the full band and the inner belt ply located inward of the full band at the equator plane of the tire is long, contact between the band cord and the belt cords in a crown portion is suppressed. A decrease in adhesion strength and a decrease in the strength of the cords due to contact between the band cord and the belt cords is suppressed. The tire can maintain good durability.

The tire can suppress a decrease in durability due to the provision of the band and can achieve improvement of uneven wear resistance.

Preferably, the distance UFc between the full band and the inner belt ply at the equator plane of the tire is not less than 0.6 mm. In this case, the band cord and the belt cords are placed with a sufficient interval therebetween. Contact between the band cord and the belt cords is suppressed. The tire can maintain good durability.

Preferably, a distance UFs between the full band and the inner belt ply at the end of the full band is not greater than 2.5 mm. In this case, heat generation of a tread portion is suppressed. An increase in the rolling resistance of the tire is suppressed.

Preferably, the distance UFc between the full band and the inner belt ply at the equator plane of the tire is longer than the distance UFs between the full band and the inner belt ply at the end of the full band. In this case, contact between the band cord and the belt cords is effectively suppressed. The tire can maintain good durability.

Preferably, a ratio (UFc/SFc) of the distance UFc between the full band and the inner belt ply to the distance SFc between the full band and the outer belt ply at the equator plane of the tire is not less than 2.0. In this case, contact between the band cord and the belt cords is effectively suppressed. The tire can maintain good durability.

Preferably, a cord density of the full band is not less than 22 ends/50 mm. In this case, the full band can effectively constrain the inner belt ply. A change in the inclination angle of the belt cords due to dimensional growth is suppressed. Strain generated between the band cord and the belt cord is reduced. Contact between the band cord and the belt cords is suppressed. The tire can maintain good durability.

Preferably, a ratio of a cord density of the inner belt ply to the cord density of the full band is not less than 0.65. In this case, dimensional growth of the crown portion is effectively suppressed. The interval between the band cord and the belt cords is appropriately maintained. Contact between the band cord and the belt cords is effectively suppressed. The tire can maintain good durability.

Preferably, an angle FU formed between the band cord of the full band and the belt cords of the inner belt ply is not less than 10 degrees and not greater than 25 degrees, and an angle FS formed between the band cord of the full band and the belt cords of the outer belt ply is not less than 10 degrees and not greater than 25 degrees. In this case, strain generated between the band cord and the belt cords of the inner belt ply and strain generated between the band cord and the belt cords of the outer belt ply are effectively reduced. Contact between the band cord and the belt cords is effectively suppressed. The tire can maintain good durability.

Preferably, an angle UE of the belt cords of the inner belt ply with respect to the equator plane of the tire is smaller than an angle SE of the belt cords of the outer belt ply with respect to the equator plane of the tire. In this case, the resistance of the inner belt ply, which is easily influenced by the dimensional growth of the carcass, to the dimensional growth of the carcass is increased. Strain generated between the band cord and the belt cords of the inner belt ply is effectively reduced. The tire can maintain good durability.

Preferably, the cord density of the inner belt ply is higher than a cord density of the outer belt ply. In this case, the resistance of the inner belt ply, which is easily influenced by the dimensional growth of the carcass, to the dimensional growth of the carcass is increased. Strain generated between the band cord and the belt cords of the inner belt ply is effectively reduced. The tire can maintain good durability.

Preferably, the plurality of circumferential grooves demarcate a plurality of land portions aligned in the axial direction in the tread; among the plurality of land portions, a land portion located on the equator plane of the tire or a land portion closest to the equator plane is a center land portion; the center land portion has a transverse sipe traversing the center land portion; the transverse sipe has a sipe body and a tubular portion located radially inward of the sipe body; and the tubular portion has a groove width wider than a groove width of the sipe body. In this case, the tire can suppress a decrease in wet performance due to wear while suppressing dimensional growth in the crown portion. The tire can maintain good wet performance while achieving suppression of a decrease in durability and improvement of uneven wear resistance.

As described above, the heavy duty tire of the present invention can suppress a decrease in durability due to the provision of the band and can achieve improvement of uneven wear resistance. This will be described in detail below with a heavy duty tire shown in FIG. 1 as an example.

Details of Embodiment of Present Invention

FIG. 1 is a cross-sectional view showing a part of a heavy duty tire 2 (hereinafter referred to simply as "tire 2") according to one embodiment of the present invention. The tire 2 is mounted to a vehicle such as a truck and a bus. The nominal aspect ratio of the tire 2 is not less than 70%. In other words, the tire 2 has a nominal aspect ratio of not less than 70%. The tire 2 is a high-flatness tire.

FIG. 1 shows a part of a cross-section (hereinafter referred to as meridian cross-section) of the tire 2 along a plane including the rotation axis of the tire 2. The tire 2 shown in FIG. 1 is a new tire with no running history.

Figure 2:
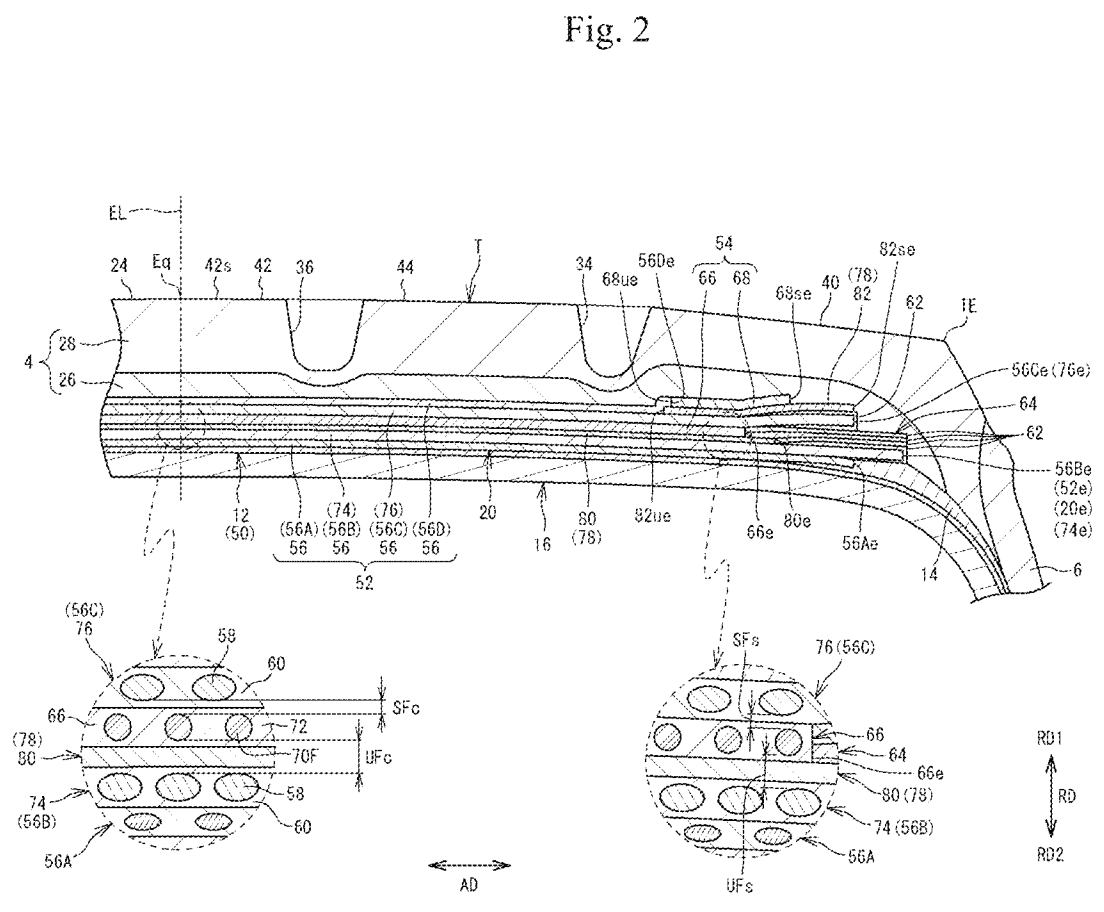

FIG. 2 is an enlarged cross-sectional view showing a part of the tire 2 shown in FIG. 1. FIG. 2 shows a tread portion T of the tire 2.

A direction indicated by a double-headed arrow AD is the axial direction of the tire 2. The axial direction of the tire 2 means a direction parallel to the rotation axis (not shown) of the tire 2. A direction indicated by a double-headed arrow RD is the radial direction of the tire 2. A direction perpendicular to the surface of the drawing sheet of FIG. 1 is the circumferential direction of the tire 2.

An alternate long and short dash line EL extending in the radial direction represents the equator plane of the tire 2.

A direction from the equator plane EL toward each end of a tread surface described later corresponds to the axially outer side of the tire 2, and a direction from each end of the tread surface toward the equator plane EL corresponds to the axially inner side of the tire 2.

A direction indicated by an arrow RD1 corresponds to the radially outer side of the tire 2, and a direction indicated by an arrow RD2 corresponds to the radially inner side of the tire 2.

The tire 2 includes a tread 4, a pair of sidewalls 6, a pair of beads 8, a pair of chafers 10, a carcass 12, a pair of cushion layers 14, an inner liner 16, a pair of steel fillers 18, and a reinforcing layer 20.

The tread 4 is located radially outward of the carcass 12. The tread 4 covers the reinforcing layer 20.

The tread 4 comes into contact with a road surface. Of an outer circumferential surface 22 of the tread 4, a portion that comes into contact with a road surface is also referred to as tread surface 24. The tread 4 has the tread surface 24 which comes into contact with a road surface.

In FIG. 1, reference character Eq indicates the point of intersection of the tread surface 24 and the equator plane EL. The point of intersection Eq is a radially outer end of the tire 2 and is also referred to as equator. In the case where a groove described later is located on the equator plane EL, the equator is specified on the basis of a virtual tread surface obtained on the assumption that there is no groove on the equator plane EL.

A position indicated by reference character TE is an end of the tread surface 24.

In the present invention, a position, on the outer surface of the tire, corresponding to an axially outer end of a ground-contact surface obtained when a standardized load is applied to the tire in the standardized state, a camber angle is set to 0°, and the tire is brought into contact with a flat surface, is represented as the end of the tread surface.

In the tire 2, the end TE of the tread surface 24 coincides with an end 22e of the outer circumferential surface 22.

In FIG. 1, a length indicated by a double-headed arrow WT is the width of the tread surface 24. The width WT of the tread surface 24 is the distance in the axial direction from one end TE to another end TE of the tread surface 24.

The tread 4 includes a base portion 26 and a cap portion 28 located radially outward of the base portion 26. The base portion 26 is formed from a crosslinked rubber that has low heat generation properties. The cap portion 28 is formed from a crosslinked rubber for which wear resistance and grip performance are taken into consideration. The cap portion 28 may be formed from a crosslinked rubber for which not only wear resistance and grip performance but also low heat generation properties are taken into consideration.

As shown in FIG. 1, the base portion 26 covers the entire reinforcing layer 20. The cap portion 28 covers the entire base portion 26.

Grooves 30 are formed on the tread 4 of the tire 2. Accordingly, a tread pattern is formed. The tread pattern formed on the tread 4 has a plurality of circumferential grooves 32 extending continuously in the circumferential direction.

The tread 4 shown in FIG. 1 has four circumferential grooves 32. These circumferential grooves 32 are aligned in the axial direction.

The four circumferential grooves 32 are each a groove having a wide groove width and having a pair of groove walls that do not come into contact with each other even if the tread 4 comes into contact with a road surface and becomes deformed, and are also referred to as circumferential main grooves. From the viewpoint of contributing to drainage performance and traction performance, the groove width of each circumferential groove 32 is preferably not less than 2% and not greater than 10% of the width WT of the tread surface 24.

In the present invention, among the plurality of circumferential grooves formed on the tread, the circumferential groove located on each outermost side in the axial direction is a shoulder circumferential groove. The circumferential groove located on the equator plane is a center circumferential groove. In the case where no circumferential groove is provided on the equator plane, the circumferential groove closest to the equator plane is a center circumferential groove. In the case where a circumferential groove is located between the center circumferential groove and the shoulder circumferential groove, the circumferential groove located between the center circumferential groove and the shoulder circumferential groove is referred to as middle circumferential groove.

Among the four circumferential grooves 32 formed on the tread 4, a circumferential groove 34 located on each outermost side in the axial direction is a shoulder circumferential groove. A circumferential groove 36 closest to the equator plane EL is a center circumferential groove. The four circumferential grooves 32 include a pair of center circumferential grooves 36 and a pair of shoulder circumferential grooves 34. Each shoulder circumferential groove 34 is located axially outward of the center circumferential groove 36.

The plurality of circumferential grooves 32 are formed on the tread 4, so that a plurality of land portions 38 aligned in the axial direction are formed. In other words, the tread 4 has the plurality of circumferential grooves 32. The plurality of circumferential grooves 32 demarcate the plurality of land portions 38 in the tread 4.

On the tread 4 of the tire 2, the four circumferential grooves 32 are formed, so that five land portions 38 are formed therein. These land portions 38 are aligned in the axial direction.

In the present invention, among the plurality of land portions formed in the tread, the land portion located on each outermost side in the axial direction is a shoulder land portion. The land portion located on the equator plane is a center land portion. In the case where no land portion is provided on the equator plane, the land portion closest to the equator plane is a center land portion. In the case where a land portion is located between the center land portion and the shoulder land portion, the land portion between the center land portion and the shoulder land portion is referred to as middle land portion.

As described above, the five land portions 38 are formed in the tread 4. Among the five land portions 38, a land portion 40 located on each outermost side in the axial direction is a shoulder land portion. A land portion 42 located on the equator plane EL is a center land portion. A land portion 44 located between the center land portion 42 and the shoulder land portion 40 is a middle land portion.

The five land portions 38 include the center land portion 42, a pair of the middle land portions 44, and a pair of the shoulder land portions 40. Each middle land portion 44 is located axially outward of the center land portion 42. Each shoulder land portion 40 is located axially outward of the middle land portion 44. The shoulder land portion 40 includes the end TE of the tread surface 24.

The width in the axial direction of the center land portion 42 is not less than 10% and not greater than 18% of the width WT of the tread surface 24. The width in the axial direction of each middle land portion 44 is not less than 10% and not greater than 18% of the width WT of the tread surface 24. The width in the axial direction of each shoulder land portion 40 is not less than 15% and not greater than 25% of the width WT of the tread surface 24. The width in the axial direction of each land portion 38 is represented as the width in the axial direction of a top surface of the land portion 38 which forms a part of the tread surface 24.

In FIG. 1, a position indicated by reference character BT is the groove bottom of the shoulder circumferential groove 34. Of the tread portion T of the tire 2, an axially outer portion from the groove bottom BT of each shoulder circumferential groove 34 is a shoulder portion, and a portion between the groove bottoms BT of the left and right shoulder circumferential grooves 34 is a crown portion.

In the present invention, the groove bottom of the groove is the deepest position in a cross-section of the groove. The distance from a line segment connecting left and right edges forming the groove opening of the groove, to the groove, is measured along a normal line of the line segment. The position at which the distance from the line segment to the groove is the largest is the groove bottom. In the case where a bottom surface including the groove bottom is composed of a flat surface, the width center of the flat surface constituting the bottom surface is used as the groove bottom. The groove depth of the groove is represented as the distance from a line segment connecting left and right edges thereof to each other, to the groove bottom, measured along a normal line of this line segment.

Each sidewall 6 is connected to an end of the tread 4. The sidewall 6 is located axially outward of the carcass 12. The sidewall 6 is formed from a crosslinked rubber.

Each bead 8 is located radially inward of the sidewall 6. The bead 8 is located axially inward of the chafer 10. The bead 8 includes a core 46 and an apex 48.

The core 46 extends in the circumferential direction. The core 46 includes a wound wire made of steel. The core 46 has a substantially hexagonal cross-sectional shape.

The apex 48 is located radially outward of the core 46. The apex 48 includes an inner apex 48$u$ and an outer apex 48$s$. The inner apex 48$u$ is located radially outward of the core 46. The outer apex 48$s$ is located radially outward of the inner apex 48$u$. The inner apex 48$u$ is formed from a hard crosslinked rubber. The outer apex 48$s$ is formed from a crosslinked rubber that is softer than the inner apex 48$u$.

Each chafer 10 is located axially outward of the bead 8. The chafer 10 is located radially inward of the sidewall 6. Although not shown, the chafer 10 comes into contact with a rim. The chafer 10 is formed from a crosslinked rubber for which wear resistance is taken into consideration.

The carcass 12 is located inward of the tread 4, the pair of sidewalls 6, and the pair of chafers 10. The carcass 12 extends on and between the pair of beads 8.

The carcass 12 includes at least one carcass ply 50. The carcass 12 of the tire 2 is composed of a normal line one carcass ply 50. The carcass ply 50 is turned up from the inner side toward the outer side in the axial direction at each bead 8. The carcass ply 50 includes a ply body 50$a$ extending between the pair of beads 8 and a pair of turned-up portions 50$b$ connected to the ply body 50$a$ and turned up at the respective beads 8.

The carcass ply 50 includes a large number of carcass cords aligned with each other, which are not shown. These carcass cords are covered with a carcass topping rubber. The carcass cords are steel cords. The carcass cords intersect the equator plane EL. The carcass 12 has a radial structure.

Each cushion layer 14 is located between the reinforcing layer 20 and the carcass 12 at an end 20$e$ of the reinforcing layer 20 (specifically, a belt described later). An inner end 14$ue$ of the cushion layer 14 is located axially inward of the end 20$e$ of the reinforcing layer 20. An outer end 14$se$ of the cushion layer 14 is located axially outward of the end 20$e$ of the reinforcing layer 20. The cushion layer 14 is formed from a soft crosslinked rubber.

The inner liner 16 is located inward of the carcass 12. The inner liner 16 is joined to the inner surface of the carcass 12 via an insulation (not shown). The inner liner 16 forms an inner surface of the tire 2. The inner liner 16 is formed from a crosslinked rubber that has an excellent air blocking property. The inner liner 16 maintains the internal pressure of the tire 2.

Each steel filler 18 is located in a bead portion B. The steel filler 18 is turned up around the bead 8 from the inner side toward the outer side in the axial direction along the carcass ply 50. The steel filler 18 includes a large number of filler cords aligned with each other, which are not shown. The filler cords are steel cords.

The reinforcing layer 20 is located radially outward of the carcass 12. The reinforcing layer 20 is located radially inward of the tread 4. The reinforcing layer 20 is located between the tread 4 and the carcass 12.

The reinforcing layer 20 includes a belt 52 and a band 54.

Figure 3:
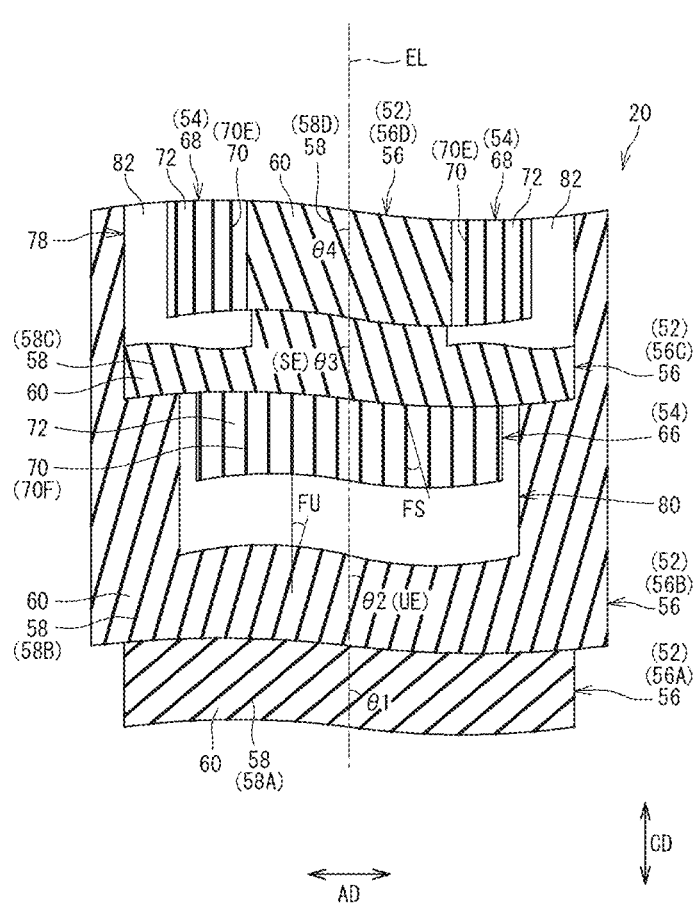
FIG. 3 is a schematic diagram illustrating the configuration of a reinforcing layer.

FIG. 3 shows the configuration of the reinforcing layer 20. A direction indicated by a double-headed arrow CD is the circumferential direction of the tire 2. A direction perpendicular to the surface of the drawing sheet of FIG. 3 is the radial direction of the tire 2. The front side of this drawing sheet is the outer side in the radial direction, and the back side of this drawing sheet is the inner side in the radial direction.

The belt 52 includes at least two belt plies 56 aligned in the radial direction. Each belt ply 56 is placed such that both ends 56$e$ thereof are opposed to each other across the equator plane EL. Each belt ply 56 intersects the equator plane EL.

The belt 52 of the tire 2 includes four belt plies 56. The four belt plies 56 are a first belt ply 56A, a second belt ply 56B, a third belt ply 56C, and a fourth belt ply 56D.

The number of belt plies 56 included in the belt 52 may be two or may be three.

The first belt ply 56A is the belt ply 56 located on the innermost side in the radial direction among the four belt plies 56 included in the belt 52. The second belt ply 56B is located radially outward of the first belt ply 56A. The third belt ply 56C is located radially outward of the second belt ply 56B. The fourth belt ply 56D is located radially outward of the third belt ply 56C. The fourth belt ply 56D is the belt ply 56 located on the outermost side in the radial direction among the four belt plies 56 included in the belt 52.

As shown in FIG. 1, the first belt ply 56A of the tire 2 is stacked on the carcass 12. The second belt ply 56B is stacked on the first belt ply 56A. The fourth belt ply 56D is stacked on the third belt ply 56C. A full band described later is located radially inward of the third belt ply 56C of the tire 2. The third belt ply 56C is stacked on the full band.

In the tire 2, the second belt ply 56B has a widest width in the axial direction, and the fourth belt ply 56D has a narrowest width in the axial direction. The first belt ply 56A and the third belt ply 56C have the same width in the axial direction, or the width in the axial direction of the first belt ply 56A is slightly wider than the width in the axial direction of the third belt ply 56C.

In the present invention, an end of the belt is represented as an end of the belt ply having a widest width in the axial direction among the plurality of belt plies included in the belt.

As described above, in the belt 52 of the tire 2, the second belt ply 56B has a widest width in the axial direction. An end 52e of the belt 52 of the tire 2 is represented as an end 56Be of the second belt ply 56B.

For example, as shown in FIG. 2, an end 56Ae of the first belt ply 56A is located axially outward of the shoulder circumferential groove 34. The end 56Be of the second belt ply 56B is also located axially outward of the shoulder circumferential groove 34. An end 56Ce of the third belt ply 56C is also located axially outward of the shoulder circumferential groove 34. An end 56De of the fourth belt ply 56D is also located axially outward of the shoulder circumferential groove 34. In the tread portion T shown in FIG. 2, ends 56e of all the belt plies 56 included in the belt 52 are located axially outward of the shoulder circumferential groove 34. In the tire 2, the end 56De of the fourth belt ply 56D may be located axially inward of the shoulder circumferential groove 34.

In FIG. 1, a length indicated by a double-headed arrow W1 is the width in the axial direction of the first belt ply 56A. A length indicated by a double-headed arrow W2 is the width in the axial direction of the second belt ply 56B. A length indicated by a double-headed arrow W3 is the width in the axial direction of the third belt ply 56C. A length indicated by a double-headed arrow W4 is the width in the axial direction of the fourth belt ply 56D. The width in the axial direction of each belt ply 56 is represented as the distance in the axial direction from one end 56e to another end 56e of the belt ply 56.

In the tire 2, from the viewpoint of ensuring the stiffness of the tread portion T, the ratio (W1/WT) of the width W1 in the axial direction of the first belt ply 56A to the width WT of the tread surface 24 is preferably not less than 0.80 and not greater than 0.90. The ratio (W2/WT) of the width W2 in the axial direction of the second belt ply 56B to the width WT of the tread surface 24 is preferably not less than 0.85 and not greater than 0.95. The ratio (W3/WT) of the width W3 in the axial direction of the third belt ply 56C to the width WT of the tread surface 24 is preferably not less than 0.80 and not greater than 0.90. The width W4 in the axial direction of the fourth belt ply 56D is set as appropriate according to the specifications of the tire 2.

As shown in FIG. 3, each belt ply 56 included in the belt 52 includes a large number of belt cords 58 aligned with each other. In FIG. 3, the belt cords 58 are represented by solid lines for convenience of description, but the belt cords 58 are covered with a belt topping rubber 60.

The belt cords 58 of the tire 2 are steel cords. The cord density of each belt ply 56 is not less than 15 ends/50 mm and not greater than 30 ends/50 mm.

In each belt ply 56, the belt cords 58 are inclined with respect to the circumferential direction.

The direction of inclination of the belt cords 58 included in the first belt ply 56A (hereinafter referred to as inclination direction of first belt cords 58A) is the same as the direction of inclination of the belt cords 58 included in the second belt ply 56B (hereinafter referred to as inclination direction of second belt cords 58B).

The inclination direction of the second belt cords 58B is opposite to the direction of inclination of the belt cords 58 included in the third belt ply 56C (hereinafter referred to as inclination direction of third belt cords 58C).

The inclination direction of the third belt cords 58C is the same as the direction of inclination of the belt cords 58 included in the fourth belt ply 56D (hereinafter referred to as inclination direction of fourth belt cords 58D).

The inclination direction of the first belt cords 58A may be opposite to the inclination direction of the second belt cords 58B. The inclination direction of the third belt cords 58C may be opposite to the inclination direction of the fourth belt cords 58D.

In FIG. 3, an angle $\theta 1$ is an angle of the belt cords 58 of the first belt ply 56A with respect to the equator plane EL (hereinafter referred to as inclination angle $\theta 1$ of the first belt cords 58A). An angle $\theta 2$ is an angle of the belt cords 58 of the second belt ply 56B with respect to the equator plane EL (hereinafter referred to as inclination angle $\theta 2$ of the second belt cords 58B). An angle $\theta 3$ is an angle of the belt cords 58 of the third belt ply 56C with respect to the equator plane EL (hereinafter referred to as inclination angle $\theta 3$ of the third belt cords 58C). An angle $\theta 4$ is an angle of the belt cords 58 of the fourth belt ply 56D with respect to the equator plane EL (hereinafter referred to as inclination angle $\theta 4$ of the fourth belt cords 58D).

The inclination angle $\theta 1$ of the first belt cords 58A, the inclination angle $\theta 2$ of the second belt cords 58B, the inclination angle $\theta 3$ of the third belt cords 58C, and the inclination angle $\theta 4$ of the fourth belt cords 58D are preferably not less than 10 degrees and not greater than 60 degrees.

From the viewpoint of effectively restricting the movement of the tread portion T and obtaining a ground-contact surface having a small shape change and having a stable shape, the inclination angle $\theta 1$ of the first belt cords 58A is more preferably not less than 40 degrees and not greater than 60 degrees. The inclination angle $\theta 2$ of the second belt cords 58B is more preferably not less than 15 degrees and not greater than 30 degrees and further preferably not less than 15 degrees and not greater than 20 degrees. The inclination angle $\theta 3$ of the third belt cords 58C is more preferably not less than 15 degrees and not greater than 30 degrees and further preferably not less than 15 degrees and not greater than 20 degrees. The inclination angle $\theta 4$ of the fourth belt cords 58D is more preferably not less than 15 degrees and not greater than 50 degrees.

As shown in FIG. 2, each of the end 56Be of the second belt ply 56B and the end 56Ce of the third belt ply 56C is covered with a rubber layer 62. Between the end 56Be of the second belt ply 56B and the end 56Ce of the third belt ply 56C each covered with the rubber layer 62, three rubber layers 62 are further placed. In the tire 2, an edge member 64 composed of a total of five rubber layers 62 is formed between the end 56Be of the second belt ply 56B and the end 56Ce of the third belt ply 56C. The edge member 64 is formed from a crosslinked rubber. The edge member 64 contributes to maintaining the interval between the end 56Be of the second belt ply 56B and the end 56Ce of the third belt ply 56C. In the tire 2, a change in the positional relationship between the end 56Be of the second belt ply 56B and the end

56Ce of the third belt ply 56C due to running is suppressed. The edge member 64 is a part of the reinforcing layer 20. The reinforcing layer 20 of the tire 2 includes a pair of edge members 64 in addition to the belt 52 and the band 54.

The band 54 includes a full band 66 and a pair of edge bands 68. The band 54 may be composed of only the full band 66 without providing the pair of edge bands 68.

The full band 66 is placed such that both ends 66e thereof are opposed to each other across the equator plane EL. Each end 66e of the full band 66 is located axially outward of the shoulder circumferential groove 34. Each end 66e of the full band 66 is located axially inward of the end 52e of the belt 52.

In FIG. 1, a length indicated by a double-headed arrow WF is the width in the axial direction of the full band 66. The width WF in the axial direction of the full band 66 is the distance in the axial direction from one end 66e to the other end 66e of the full band 66. In the tire 2, from the viewpoint of ensuring the stiffness of the tread portion T, the ratio (WF/WT) of the width WF in the axial direction of the full band 66 to the width WT of the tread surface 24 is preferably not less than 0.70 and not greater than 0.80.

The pair of edge bands 68 are placed so as to be spaced apart from each other in the axial direction with the equator plane EL therebetween. Each edge band 68 is located between the tread 4 and the full band 66. The edge band 68 is located axially outward of the shoulder circumferential groove 34.

The edge band 68 is located radially outward of the end 66e of the full band 66. An inner end 68ue of the edge band 68 is located axially inward of the end 66e of the full band 66. An outer end 68se of the edge band 68 is located axially outward of the end 66e of the full band 66. The edge band 68 overlaps the end 66e of the full band 66 in the radial direction.

The outer end 68se of the edge band 68 is located axially inward of the end 52e of the belt 52. As described above, the end 66e of the full band 66 is also located axially inward of the end 52e of the belt 52. The end 52e of the belt 52 of the tire 2 is also the end 20e of the reinforcing layer 20.

As shown in FIG. 3, each of the full band 66 and the edge bands 68 included in the band 54 includes a helically wound band cord 70. In FIG. 3, each band cord 70 is represented by a solid line for convenience of description, but each band cord 70 is covered with a band topping rubber 72.

Each band cord 70 of the tire 2 is a steel cord. A cord formed from an organic fiber (hereinafter referred to as organic fiber cord) may be used as the band cord 70. In this case, examples of the organic fiber include nylon fibers, polyester fibers, rayon fibers, and aramid fibers. A band cord 70F of the full band 66 and a band cord 70E of each edge band 68 may be the same or different. The band cords 70 used for the full band 66 and the edge bands 68 are determined according to the specifications of the tire 2.

As described above, the full band 66 includes the helically wound band cord 70F. The full band 66 has a jointless structure. In the full band 66, an angle of the band cord 70F with respect to the circumferential direction is preferably not greater than 5 degrees and more preferably not greater than 2 degrees. The band cord 70F extends substantially in the circumferential direction.

As described above, each edge band 68 includes the helically wound band cord 70E. The edge band 68 has a jointless structure. In the edge band 68, an angle of the band cord 70E with respect to the circumferential direction is preferably not greater than 5 degrees and more preferably not greater than 2 degrees. The band cord 70E of the edge band 68 extends substantially in the circumferential direction.

Each edge band 68 is located axially outward of the fourth belt ply 56D. In the tire 2, the inner end 68ue of the edge band 68 is abutted to the end 56De of the fourth belt ply 56D. The edge band 68 is located radially outward of the third belt ply 56C. A narrow buffer layer described later is located between the edge band 68 and the third belt ply 56C.

The full band 66 of the tire 2 is located between the second belt ply 56B and the third belt ply 56C. The second belt ply 56B is located radially inward of the full band 66, and the third belt ply 56C is located radially outward of the full band 66. As described above, the direction of inclination of the belt cords 58 included in the second belt ply 56B is opposite to the direction of inclination of the belt cords 58 included in the third belt ply 56C.

The full band 66 is located between the two belt plies 56 in which the directions of inclination of the belt cords 58 are opposite to each other.

In the present invention, in the case where a full band is located between two belt plies in which the directions of inclination of the belt cords are opposite to each other, the belt ply located radially inward of this full band is referred to as inner belt ply, and the belt ply located radially outward of this full band is referred to as outer belt ply.

In the tire 2, the full band 66 is located between the second belt ply 56B and the third belt ply 56C, and the direction of inclination of the belt cords 58 included in the second belt ply 56B is opposite to the direction of inclination of the belt cords 58 included in the third belt ply 56C. The second belt ply 56B is an inner belt ply 74, and the third belt ply 56C is an outer belt ply 76.

If the full band 66 is located between the first belt ply 56A and the second belt ply 56B and the direction of inclination of the belt cords 58 included in the first belt ply 56A is opposite to the direction of inclination of the belt cords 58 included in the second belt ply 56B, the first belt ply 56A is an inner belt ply, and the second belt ply 56B is an outer belt ply. If the full band 66 is located between the third belt ply 56C and the fourth belt ply 56D and the direction of inclination of the belt cords 58 included in the third belt ply 56C is opposite to the direction of inclination of the belt cords 58 included in the fourth belt ply 56D, the third belt ply 56C is an inner belt ply, and the fourth belt ply 56D is an outer belt ply.

The belt 52 of the tire 2 includes the inner belt ply 74 and the outer belt ply 76 aligned in the radial direction, and the direction of inclination of the belt cords 58 included in the inner belt ply 74 is opposite to the direction of inclination of the belt cords 58 included in the outer belt ply 76. The band 54 includes the full band 66. The full band 66 is located between the inner belt ply 74 and the outer belt ply 76. Each end 74e of the inner belt ply 74, each end 76e of the outer belt ply 76, and each end 66e of the full band 66 are located axially outward of the shoulder circumferential groove 34.

As shown in FIG. 2, the end 74e of the inner belt ply 74 is located axially outward of the end 66e of the full band 66. The end 76e of the outer belt ply 76 is also located axially outward of the end 66e of the full band 66. The inner belt ply 74 and the outer belt ply 76 each have a width in the axial direction wider than the width WF in the axial direction of the full band 66.

As described above, the band cord 70F of the full band 66 extends substantially in the circumferential direction. The full band 66 suppresses dimensional growth due to the action of the tire internal pressure and centrifugal force. The full band 66 suppresses changes in profile and ground-contact shape. The full band 66 can contribute to improving the uneven wear resistance of the tire 2.

The inner belt ply 74 and the outer belt ply 76 are located on both sides of the full band 66 in the radial direction. The inner belt ply 74 and the outer belt ply 76 reduce the force acting on the full band 66. Since the direction of inclination of the belt cords 58 included in the inner belt ply 74 is opposite to the direction of inclination of the belt cords 58 included in the outer belt ply 76, the force acting on the full band 66 is effectively reduced. The fluctuation of tension generated at the band cord 70F of the full band 66 is suppressed to be small, so that the full band 66 can stably exhibit its function.

The full band 66 of the tire 2 can effectively contribute to suppressing dimensional growth. The tire 2 can suppress changes in profile and ground-contact shape. The uneven wear resistance of the tire 2 is improved.

As described above, the inner belt ply 74 is the second belt ply 56B having a widest width in the axial direction among the belt plies 56 included in the belt 52. From the viewpoint of improving uneven wear resistance, in the case where the belt 52 is composed of a plurality of belt plies 56 aligned in the radial direction, the belt ply 56 having a widest width in the axial direction among the plurality of belt plies 56 included in the belt 52 is preferably the inner belt ply 74.

As described above, the carcass of a tire in a running state attempts to expand outward due to the action of the internal pressure of the tire and centrifugal force. In the case where a full band is stacked on a belt ply, the distance between the full band and the belt ply, in other words, the distance between a band cord and belt cords, is expected to gradually decrease. In particular, in the case where a full band is interposed between two belt plies aligned in the radial direction, the distance between the band cord of the full band and the belt cords of the belt ply located on the inner side of the full band is expected to decrease significantly compared to the distance between the band cord and the belt cords of the belt ply located on the outer side of the full band.

In a high-flatness tire, the action of the tire internal pressure is stronger at a crown portion and is weaker at each shoulder portion. Thus, dimensional growth of the crown portion is promoted. In the high-flatness tire, the distance between a band cord and belt cords is expected to decrease at the crown portion to increase strain generated between the band cord and the belt cords.

If the distance between the band cord and the belt cords is insufficient, contact between the band cord and the belt cords may occur, and depending on the degree of contact, the adhesion strength between the full band and the belt ply may decrease, or the strength of the band cord or the belt cords may decrease. The decrease in the adhesion strength and the decrease in the strength of the cords influence the durability of the tire.

In FIG. 2, a length indicated by a double-headed arrow UFc is the distance between the full band 66 and the inner belt ply 74 at the equator plane EL. The distance UFc is represented as the distance between the band cord 70F of the full band 66 and the belt cords 58 of the inner belt ply 74.

A length indicated by a double-headed arrow SFc is the distance between the full band 66 and the outer belt ply 76 at the equator plane EL. The distance SFc is represented as the distance between the band cord 70F of the full band 66 and the belt cords 58 of the outer belt ply 76.

A length indicated by a double-headed arrow UFs is the distance between the full band 66 and the inner belt ply 74 at the end 66e of the full band 66. The distance UFs is represented as the distance between the band cord 70F and the belt cord 58 of the inner belt ply 74 closest to the end 66e of the full band 66.

A length indicated by a double-headed arrow SFs is the distance between the full band 66 and the outer belt ply 76 at the end 66e of the full band 66. The distance SFs is represented as the distance between the band cord 70F and the belt cord 58 of the outer belt ply 76 closest to the end 66e of the full band 66.

Each of the distance UFc, the distance SFc, the distance UFs, and the distance SFs is an inter-cord distance. Each of these distances corresponds to the thickness of the rubber component located between the band cord 70F and the belt cords 58. The distance SFs is substantially equal to the distance SFc. In other words, the ratio (SFs/SFc) of the distance SFs to the distance SFc is not less than 0.95 and not greater than 1.05.

In the tire 2, at the equator plane EL, the distance UFc between the full band 66 and the inner belt ply 74 is longer than the distance SFc between the full band 66 and the outer belt ply 76.

As described above, dimensional growth is promoted in the crown portion of a high-flatness tire. In the crown portion, the distance between the full band 66 and the inner belt ply 74, which is located inward of the full band 66, is long. Therefore, contact between the band cord 70F and the belt cords 58 in the crown portion is suppressed. A decrease in the adhesion strength between the full band 66 and the inner belt ply 74 and a decrease in the strength of the band cord 70F or the belt cords 58 due to contact between the band cord 70F and the belt cords 58 are suppressed. The tire 2 can maintain good durability.

The tire 2 can suppress a decrease in durability due to the provision of the band 54 and can achieve improvement of uneven wear resistance.

In the tire 2, the distance UFc between the full band 66 and the inner belt ply 74 at the equator plane EL is set to be not less than 0.6 mm. Accordingly, in the tire 2, the band cord 70F and the belt cords 58 are placed with a sufficient interval therebetween in the crown portion. Strain generated between the band cord 70F and and the belt cords 58 is reduced. The tire 2 can suppress contact between the band cord 70F and the belt cords 58. The tire 2 can maintain good durability. From this viewpoint, the distance UFc is preferably not less than 0.6 mm and more preferably not less than 0.8 mm. If the amount of the rubber component located between the band cord 70F and the belt cords 58 is large, there is a concern that heat generation due to repeated deformation may be promoted, and as a result, the rolling resistance of the tire 2 may be increased. From the viewpoint of suppressing an increase in rolling resistance, the distance UFc is preferably not greater than 3.0 mm.

The distance UFs between the full band 66 and the inner belt ply 74 at the end 66e of the full band 66 is preferably not greater than 2.5 mm. Accordingly, the tire 2 can suppress an increase in rolling resistance. From this viewpoint, the distance UFs is more preferably not greater than 2.0 mm. From the viewpoint of suppressing contact between the band cord 70F and the belt cords 58, the distance UFs is preferably not less than 0.5 mm and more preferably not less than 0.8 mm.

As described above, the tire 2 is a high-flatness tire. In the tire 2, strain generated between the band cord 70F of the full band 66 and the belt cords 58 of the inner belt ply 74 is likely to be concentrated in the crown portion.

However, in the tire 2, the distance UFc between the full band 66 and the inner belt ply 74 at the equator plane EL of the tire 2 is set to be longer than the distance UFs between the full band 66 and the inner belt ply 74 at the end 66e of the full band 66. The tire 2 can reduce strain generated between the band cord 70F of the full band 66 and the belt cords 58 of the inner belt ply 74 in the crown portion. The tire 2 can suppress contact between the band cord 70F and the belt cords 58. The tire 2 can maintain good durability. From this viewpoint, it is preferable that the distance UFc between the full band 66 and the inner belt ply 74 at the equator plane EL of the tire 2 is longer than the distance UFs between the full band 66 and the inner belt ply 74 at the end 66e of the full band 66. Specifically, the ratio (UFc/UFs) of the distance UFc to the distance UFs is preferably not less than 1.05 and more preferably not less than 1.10. From the viewpoint of suppressing heat generation of the rubber component located between the band cord 70F and the belt cords 58 and maintaining low rolling resistance, the ratio (UFc/UFs) is preferably not greater than 1.50.

The ratio (UFc/SFc) of the distance UFc between the full band 66 and the inner belt ply 74 to the distance SFc between the full band 66 and the outer belt ply 76 at the equator plane EL of the tire 2 is preferably not less than 2.0. Accordingly, contact between the band cord 70F and the belt cords 58 is effectively suppressed. The tire 2 has good durability. From this viewpoint, the ratio (UFc/SFc) is more preferably not less than 2.5. From the viewpoint of suppressing heat generation of the rubber component located between the band cord 70F and the belt cords 58 and maintaining low rolling resistance, the ratio (UFc/SFc) is preferably not greater than 3.0.

In the tire 2, the distance between the band cord 70 and the belt cords 58 is controlled. The distance between the band cord 70 and the belt cords 58 is controlled by adjusting the thicknesses of the band topping rubber 72 and the belt topping rubber 60. In the case of setting a relatively long distance such as the distance between the full band 66 and the inner belt ply 74 of the tire 2, from the viewpoint of being able to precisely control the distance, the distance between the band cord 70 and the belt cords 58 is preferably controlled using a buffer layer 78 formed from a crosslinked rubber. In other words, it is preferable that the reinforcing layer 20 of the tire 2 includes the buffer layer 78 formed from a crosslinked rubber.

The buffer layer 78 of the tire 2 includes a wide buffer layer 80 and a pair of narrow buffer layers 82.

The wide buffer layer 80 is located between the full band 66 and the inner belt ply 74. Each end 80e of the wide buffer layer 80 is located between the end 66e of the full band 66 and the end 74e of the inner belt ply 74 in the axial direction. The entire full band 66 is stacked on the wide buffer layer 80. The wide buffer layer 80 is used to control the distance between the full band 66 and the inner belt ply 74, specifically the above-described distances UFc and UFs.

Each narrow buffer layer 82 is located between the edge band 68 and the outer belt ply 76. An inner end 82ue of the narrow buffer layer 82 is located axially inward of the inner end 68ue of the edge band 68. An outer end 82se of the narrow buffer layer 82 is located axially outward of the outer end 68se of the edge band 68. The entire edge band 68 is stacked on the narrow buffer layer 82. The narrow buffer layer 82 is used to control the distance between the edge band 68 and the outer belt ply 76.

As described above, the buffer layer 78 is formed from a crosslinked rubber. From the viewpoint that each of the wide buffer layer 80 and the narrow buffer layers 82 can contribute to reducing strain generated between the band cord 70 and the belt cords 58 and suppressing heat generation, a stress M at 200% elongation of the buffer layer 78 and a loss tangent LT at 70° C. of the buffer layer 78 are controlled.

Specifically, the ratio (M/LT) of the stress M at 200% elongation to the loss tangent LT at 70° C. of the buffer layer 78 is preferably not less than 75. Accordingly, a buffer layer 78 at which strain is less likely to be generated and heat is less likely to be generated is formed. The buffer layer 78 can contribute to suppressing a decrease in durability and an increase in rolling resistance. From this viewpoint, the ratio (M/LT) is more preferably not less than 80 and further preferably not less than 100. It is more preferable if the ratio (M/LT) is larger, and thus a preferable upper limit is not set. The ratio (M/LT) is calculated with the unit of the stress M at 200% elongation as MPa (megapascal).

In the tire 2, from the viewpoint that a buffer layer 78 having appropriate stiffness is formed, the stress M at 200% elongation of the buffer layer 78 is preferably not less than 11 MPa. From the viewpoint of being able to appropriately maintain the stiffness difference between the buffer layer 78 and another rubber component located therearound and suppress a decrease in adhesion strength caused by the stiffness difference, the stress M at 200% elongation is preferably not greater than 15 MPa.

The cord density of the full band 66 is preferably not less than 22 ends/50 mm. Accordingly, the constraining force of the full band 66 is increased. The full band 66 of the tire 2 can effectively constrain the inner belt ply 74. The movement of the inner belt ply 74 in the crown portion is suppressed. Strain generated between the band cord 70F and the belt cords 58 in the crown portion is reduced. Contact between the band cord 70F and the belt cords 58 is suppressed. The tire 2 can maintain good durability. From this viewpoint, the cord density of the full band 66 is more preferably not less than 24 ends/50 mm. From the viewpoint of effectively suppressing the influence of the full band 66 on the stiffness of the tread portion T, the cord density of the full band 66 is preferably not greater than 35 ends/50 mm. The density of the band cord 70E in the edge band 68 is preferably not less than 20 ends/50 mm and not greater than 35 ends/50 mm.

In the present invention, the cord density of the full band 66 is represented as the number of cross-sections of the band cord 70F included per 50 mm width of the full band 66 in a cross-section of the full band 66 included in the meridian cross-section of the tire 2. The cord density of the edge band 68 is also obtained in the same manner as the cord density of the full band 66.

The ratio of the cord density of the inner belt ply 74 to the cord density of the full band 66 is preferably not less than 0.65. Accordingly, the dimensional growth in the crown portion is effectively suppressed. Contact between the band cord 70F and the belt cords 58 is effectively suppressed. The tire 2 can maintain good durability. From this viewpoint, the ratio of the cord density of the inner belt ply 74 to the cord density of the full band 66 is more preferably not less than 0.75. From the viewpoint of effectively suppressing the influence of the inner belt ply 74 on the stiffness of the tread portion T, this ratio is preferably not greater than 0.95.

The cord density of the inner belt ply 74 is preferably higher than the cord density of the outer belt ply 76. Accordingly, the resistance of the inner belt ply 74, which is easily influenced by the dimensional growth of the carcass 12, to the dimensional growth of the carcass 12 is increased. Strain generated between the band cord 70F and the belt cords 58 of the inner belt ply 74 is effectively reduced. The tire 2 can maintain good durability. From this viewpoint, the ratio of the cord density of the inner belt ply 74 to the cord density of the outer belt ply 76 is more preferably not less than 1.05. From the viewpoint of effectively suppressing the influence of the inner belt ply 74 on the stiffness of the tread portion T, this ratio is more preferably not greater than 1.50.

In FIG. 3, an angle indicated by reference character FU is an angle formed between the band cord 70F of the full band 66 and the belt cords 58 of the inner belt ply 74. An angle indicated by reference character FS is an angle formed between the band cord 70F of the full band 66 and the belt cords 58 of the outer belt ply 76.

The angle FU formed between the band cord 70F of the full band 66 and the belt cords 58 of the inner belt ply 74 is preferably not less than 10 degrees and not greater than 25 degrees. Accordingly, strain generated between the band cord 70F and the belt cords 58 is effectively reduced. Contact between the band cord 70F and the belt cords 58 is effectively suppressed. The tire 2 can maintain good durability. From this viewpoint, the angle FU is more preferably not less than 15 degrees and not greater than 20 degrees.

The angle FS formed between the band cord 70F of the full band 66 and the belt cords 58 of the outer belt ply 76 is preferably not less than 10 degrees and not greater than 25 degrees. Accordingly, strain generated between the band cord 70F and the belt cords 58 is effectively reduced. Contact between the band cord 70F and the belt cords 58 is effectively suppressed. The tire 2 can maintain good durability. From this viewpoint, the angle FS is more preferably not less than 15 degrees and not greater than 20 degrees.

From the viewpoint of maintaining good durability, it is more preferable that the angle FU is not less than 10 degrees and not greater than 25 degrees and the angle FS is not less than 10 degrees and not greater than 25 degrees.

In FIG. 3, an angle indicated by reference character UE is an angle of the belt cords 58 of the inner belt ply 74 with respect to the equator plane EL. As described above, the second belt ply 56B of the tire 2 is the inner belt ply 74. The angle UE corresponds to the inclination angle θ2 of the belt cords 58 of the second belt ply 56B.

An angle indicated by reference character SE is an angle of the belt cords 58 of the outer belt ply 76 with respect to the equator plane EL. As described above, the third belt ply 56C of the tire 2 is the outer belt ply 76. The angle SE corresponds to the inclination angle θ3 of the belt cords 58 of the third belt ply 56C.

The angle UE of the belt cords 58 of the inner belt ply 74 with respect to the equator plane EL is preferably smaller than the angle SE of the belt cords 58 of the outer belt ply 76 with respect to the equator plane EL. Accordingly, the resistance of the inner belt ply 74, which is easily influenced by the dimensional growth of the carcass 12, to the dimensional growth of the carcass 12 is increased. Strain generated between the band cord 70F and the belt cords 58 of the inner belt ply 74 is effectively reduced. The tire 2 can maintain good durability. From this viewpoint, the difference (SE-UE) between the angle SE and the angle UE is more preferably not less than 1 degree and not greater than 15 degrees.

In the tire 2, the distance between the full band 66 and the inner belt ply 74 is set to a relatively long distance. This increases the volume of the tread portion T. The increase in volume increases the amount of heat generated in the tread portion T. In order to suppress an increase in rolling resistance, a thin tread 4 may be adopted. In this case, the groove depth of each circumferential groove 32 provided on the tread 4 is preferably not greater than 14 mm. If a thin tread 4 cannot be adopted due to the specifications of the tire 2, it is preferable that the cap portion 28 is formed from a crosslinked rubber whose loss tangent at 70° C. is not greater than 0.06.

Figure 4:
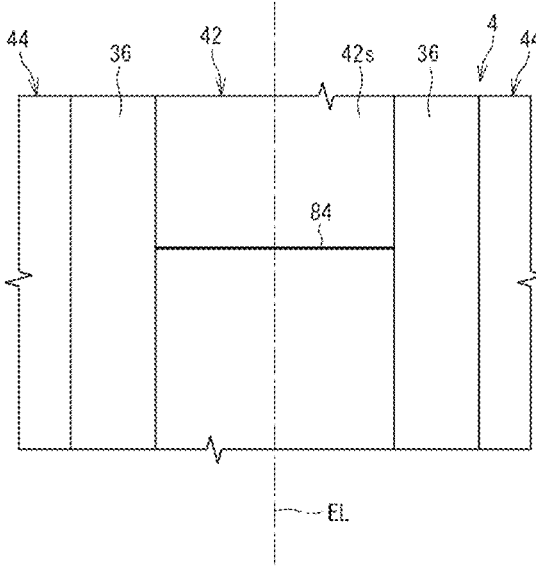
FIG. 4 is a development view showing a part of a tread.

FIG. 4 is a development view showing a part of the tread 4. FIG. 4 shows a part of the tread surface 24, specifically, a part of a land surface 42s of the center land portion 42.

In the tire 2, a transverse sipe 84 can be provided on the center land portion 42 so as to traverse the center land portion 42. The transverse sipe 84 may also be provided on the land portions 38 other than the center land portion 42 (e.g., the middle land portions 44).

The transverse sipe 84 of the tire 2 extends in the axial direction. The transverse sipe 84 may extend so as to be inclined with respect to the axial direction.

The transverse sipe 84 connects one center circumferential groove 36 and the other center circumferential groove 36. In other words, the transverse sipe 84 connects two circumferential grooves 32.

Although not shown, the center land portion 42 has a plurality of transverse sipes 84. The plurality of transverse sipes 84 are aligned in the circumferential direction. The plurality of transverse sipes 84 are arranged at predetermined intervals.

Figure 5:
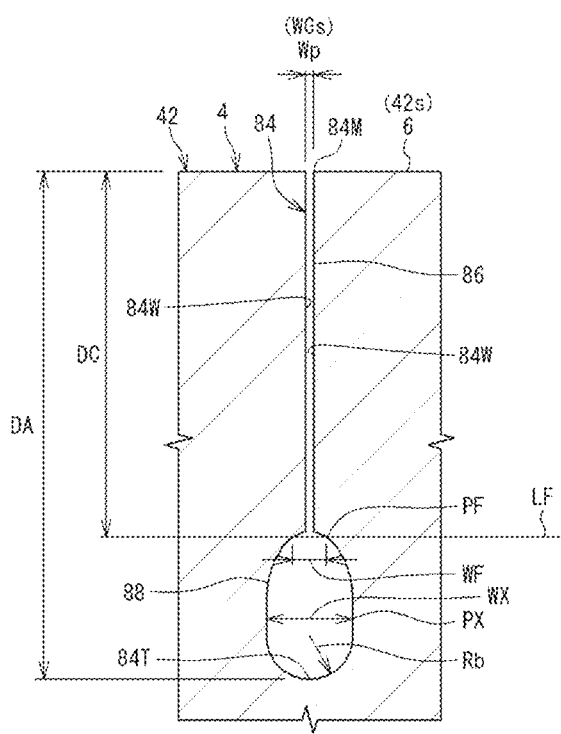
FIG. 5 is a cross-sectional view taken along an equator plane.

FIG. 5 shows a cross-section of the transverse sipe 84. The cross-section of the transverse sipe 84 shown in FIG. 5 is a cross-section of the transverse sipe 84 along a plane perpendicular to the longitudinal direction of the transverse sipe 84.

The transverse sipe 84 has a sipe body 86 and a tubular portion 88. The sipe body 86 includes a groove opening 84M of the transverse sipe 84. The tubular portion 88 includes a groove bottom 84T of the transverse sipe 84.

As shown in FIG. 4, the sipe body 86 extends straight in the longitudinal direction of the transverse sipe 84. As shown in FIG. 5, the sipe body 86 extends straight in the depth direction of the transverse sipe 84. In FIG. 5, a length indicated by a double-headed arrow Wp is the groove width of the sipe body 86. The sipe body 86 has a groove width Wp which is uniform in the depth direction thereof.

The tubular portion 88 is located radially inward of the sipe body 86. The tubular portion 88 extends in the longitudinal direction of the transverse sipe 84.

In FIG. 5, a solid line LF is a boundary line between the sipe body 86 and the tubular portion 88. A length indicated by a double-headed arrow WF is the groove width of the transverse sipe 84 measured along the boundary line LF. The boundary line LF is set at a position at which the groove width WF is 1.0 mm.

The groove width Wp of a portion outside the boundary line LF, that is, the sipe body 86, is less than 1.0 mm. The groove width of a portion inside the boundary line LF, that is, the tubular portion 88, is not less than 1.0 mm. The groove width of the tubular portion 88 is wider than the groove width Wp of the sipe body 86.

The tubular portion 88 extends inward from the position of the boundary line LF. In FIG. 5, a length indicated by a double-headed arrow WX is the maximum groove width of the tubular portion 88. In FIG. 5, a position indicated by reference character PX is a position at which the tubular portion 88 has the maximum groove width WX (hereinafter referred to as maximum groove width position PX). The tubular portion 88 is tapered outward from a portion where the tubular portion 88 has the maximum groove width WX. The tubular portion 88 is tapered inward from the portion where the tubular portion 88 has the maximum groove width WX.

The cross-sectional shape of the tubular portion 88 may be a circle or may be an ellipse. The tubular portion 88 may have a shape in which the portion where the tubular portion 88 has the maximum groove width WX is represented by a straight line and the sipe body 86 side and the groove bottom 84T side of the straight portion are represented by arcs, that is, a track-like cross-sectional shape.

As grooves formed on the tread of a tire in order to improve wet performance, there are lateral grooves. Each lateral groove is a groove formed on a land portion so as to traverse the land portion. The lateral groove normally has a wide groove width, and a pair of wall surfaces thereof do not come into contact with each other even when the tire comes into contact with a road surface. The lateral groove can contribute to improving wet performance, but decreases the stiffness of the land portion. As described above, in a high-flatness tire, dimensional growth of a crown portion is promoted. For example, in the case where lateral grooves are provided on the center land portion 42 in order to improve wet performance, there is a concern that the tire 2 cannot sufficiently suppress dimensional growth, even though the full band 66 is provided in order to suppress dimensional growth.

However, in the case where the transverse sipe 84 is provided on the center land portion 42, the sipe body 86 can function as an edge component. The sipe body 86 can contribute to improving wet performance. As described above, the groove width Wp of the sipe body 86 is less than 1.0 mm. When a load acts on the center land portion 42 and the center land portion 42 becomes deformed, a pair of wall surfaces 84W of the transverse sipe 84 come into contact with and support each other at the sipe body 86. Accordingly, the deformation of the center land portion 42 is suppressed. This can contribute to improving uneven wear resistance.

By providing the transverse sipes 84 instead of lateral grooves on the center land portion 42, the tire 2 can improve wet performance while suppressing a decrease in the stiffness of the center land portion 42. Since a decrease in the stiffness of the center land portion 42 is suppressed, the full band 66 can sufficiently exhibit its function.

The tire 2 can suppress a decrease in durability due to the provision of the band 54 and can achieve improvement of uneven wear resistance.

The tread 4 of the tire 2 becomes worn. Accordingly, the deformation allowance of the tread 4 is reduced, so that it is apparent that the stiffness of the tread 4 is increased. The increase in stiffness decreases wet performance. There is also a concern that the wet performance of the tire 2 may be decreased when the tread 4 becomes worn.

However, each transverse sipe 84 of the tire 2 has the tubular portion 88 on the radially inner side of the sipe body 86. The tubular portion 88 becomes exposed when the sipe body 86 disappears. The tubular portion 88 has a wide groove width. After the sipe body 86 disappears, the tubular portion 88 can contribute to maintaining wet performance. In the tire 2, good wet performance is maintained until a state where the tire 2 is worn and tire replacement is required is reached.

The tire 2 can suppress a decrease in wet performance due to wear while suppressing dimensional growth in the crown portion. The tire 2 can maintain good wet performance while achieving suppression of a decrease in durability and improvement of uneven wear resistance. From this viewpoint, it is preferable that the center land portion 42 has a transverse sipe 84 traversing the center land portion 42, the transverse sipe 84 has a sipe body 86 and a tubular portion

88 located radially inward of the sipe body 86, and the tubular portion 88 has a groove width wider than the groove width of the sipe body 86.

The maximum groove width WX of the tubular portion 88 is preferably not less than 4 times and more preferably not less than 5 times the groove width Wp of the sipe body 86. Accordingly, the tubular portion 88 can contribute to maintaining wet performance. The maximum groove width WX of the tubular portion 88 is preferably not greater than 13 times and more preferably not greater than 12 times the groove width Wp of the sipe body 86. Accordingly, the size of the tubular portion 88 is appropriately maintained. A decrease in the stiffness of the center land portion 42 is suppressed.

As described above, the tubular portion 88 has a bottom surface including the groove bottom 84T of the transverse sipe 84. In the cross-section shown in FIG. 5, the contour of the bottom surface of the tubular portion 88 is represented by an arc passing through the groove bottom 84T. An arrow Rb in FIG. 5 indicates the radius of this arc.

The radius Rb of the arc representing the contour of the bottom surface of the tubular portion 88 is preferably not less than 1.5 mm and not greater than 3.5 mm.

When the radius Rb is set to be not less than 1.5 mm, occurrence of cracking at the groove bottom 84T is effectively suppressed. From this viewpoint, the radius Rb is more preferably not less than 2.0 mm.

When the radius Rb is set to be not greater than 3.5 mm, a decrease in the stiffness of the center land portion 42 due to the provision of the tubular portion 88 in the transverse sipe 84 is suppressed. The stiffness of the center land portion 42 is appropriately maintained. The tire 2 can improve uneven wear resistance. From this viewpoint, the radius Rb is more preferably not greater than 3.0 mm.

In FIG. 5, a length indicated by a double-headed arrow DA is the groove depth of the transverse sipe 84. A length indicated by a double-headed arrow DC is the groove depth of the sipe body 86.

In the tire 2, the groove depth DA of the transverse sipe 84 is equal to the groove depth of the center circumferential groove 36, or the transverse sipe 84 is shallower than the center circumferential groove 36. Specifically, the groove depth DA of the transverse sipe 84 is not less than 0.80 times and not greater than 1.00 times the groove depth of the center circumferential groove 36.

The ratio (DC/DA) of the groove depth DC of the sipe body 86 of the transverse sipe 84 to the groove depth DA of the transverse sipe 84 is preferably not less than 0.35 and not greater than 0.80.

When the ratio (DC/DA) is set to be not less than 0.35, the tubular portion 88 can be exposed at an appropriate timing in the tire 2. The tire 2 allows the wear of the tread 4 to progress while maintaining the stiffness of the center land portion 42. The tire 2 can maintain good uneven wear resistance. From this viewpoint, the ratio (DC/DA) is more preferably not less than 0.40.

When the ratio (DC/DA) is set to be not greater than 0.80, the tubular portion 88 can contribute to maintaining wet performance after the sipe body 86 disappears. From this viewpoint, the ratio (DC/DA) is more preferably not greater than 0.75.

Figure 6:
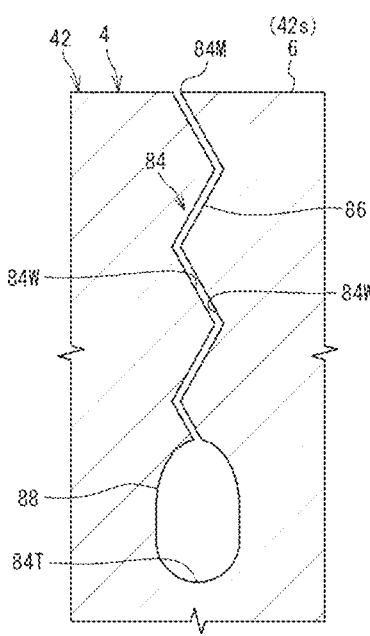
FIG. 6 is a cross-sectional view showing a modification of a transverse sipe.

FIG. 6 shows a modification of the transverse sipe 84. In this transverse sipe 84, the configuration of the sipe body 86 is different from that of the transverse sipe 84 shown in FIG. 5.

The sipe body 86 of the transverse sipe 84 extends in a zigzag manner in the depth direction thereof. Although not shown, the sipe body 86 also extends in a zigzag manner in the longitudinal direction thereof. The sipe body 86 extends in a zigzag manner in the longitudinal direction and the depth direction thereof. The amplitude of the zigzag is preferably not less than 0.5 mm and not greater than 3.0 mm, for example. The sipe body 86 is a three-dimensional sipe. The sipe body 86 shown in FIG. 5 is also referred to as two-dimensional sipe.

At this transverse sipe 84 as well, the wall surfaces 84W thereof come into contact with and support each other in the tire 2 during running. Since the sipe body 86 is a three-dimensional sipe, when the tread 4 becomes deformed and the wall surfaces 84W of the sipe body 86 come into close contact with each other, the wall surfaces 84W constrain each other and the stiffness of the center land portion 42 is effectively increased. The tire 2 can improve wet performance while suppressing a decrease in the stiffness of the center land portion 42. The tire 2 can suppress a decrease in durability due to the provision of the band 54 and can achieve improvement of uneven wear resistance. From this viewpoint, in the case where the transverse sipe 84 is provided on the center land portion 42, it is preferable that the sipe body 86 of the transverse sipe 84 extends in a zigzag manner in the longitudinal direction and the depth direction thereof.

As is obvious from the above description, a heavy duty tire that can suppress a decrease in durability due to the provision of a band and can achieve improvement of uneven wear resistance, is obtained.

The above-described technology capable of suppressing a decrease in durability due to the provision of a band and achieving improvement of uneven wear resistance, can be applied to various tires.

Additional Note

The present invention includes aspects described below.

[1]A heavy duty tire having a nominal aspect ratio of not less than 70%, the tire including:
a pair of beads;
a carcass extending on and between the pair of beads;
a reinforcing layer located radially outward of the carcass; and
a tread covering the reinforcing layer and configured to come into contact with a road surface, wherein
the tread has a plurality of circumferential grooves extending continuously in a circumferential direction,
the plurality of circumferential grooves include a shoulder circumferential groove located on each outermost side in an axial direction,
the reinforcing layer includes a belt including a large number of belt cords aligned with each other, and a band including a helically wound band cord,
the belt includes an inner belt ply and an outer belt ply aligned in a radial direction,
a direction of inclination of the belt cords included in the inner belt ply is opposite to a direction of inclination of the belt cords included in the outer belt ply,
the band includes a full band located between the inner belt ply and the outer belt ply,
ends of the inner belt ply, the outer belt ply, and the full band are located axially outward of the shoulder circumferential groove, and
a distance UFc between the full band and the inner belt ply is longer than a distance SFc between the full band and the outer belt ply at an equator plane of the tire.

[2] The heavy duty tire according to [1] above, wherein the distance UFc between the full band and the inner belt ply at the equator plane of the tire is not less than 0.6 mm.

[3] The heavy duty tire according to [1] or [2] above, wherein a distance UFs between the full band and the inner belt ply at the end of the full band is not greater than 2.5 mm.

[4] The heavy duty tire according to any one of [1] to [3] above, wherein the distance UFc between the full band and the inner belt ply at the equator plane of the tire is longer than a distance UFs between the full band and the inner belt ply at the end of the full band.

[5] The heavy duty tire according to any one of [1] to [4] above, wherein a ratio (UFc/SFc) of the distance UFc between the full band and the inner belt ply to the distance SFc between the full band and the outer belt ply at the equator plane of the tire is not less than 2.0.

[6] The heavy duty tire according to any one of [1] to [5] above, wherein a cord density of the full band is not less than 22 ends/50 mm.

[7] The heavy duty tire according to any one of [1] to [6] above, wherein a ratio of a cord density of the inner belt ply to a cord density of the full band is not less than 0.65.

[8] The heavy duty tire according to any one of [1] to [7] above, wherein
an angle FU formed between the band cord of the full band and the belt cords of the inner belt ply is not less than 10 degrees and not greater than 25 degrees, and
an angle FS formed between the band cord of the full band and the belt cords of the outer belt ply is not less than 10 degrees and not greater than 25 degrees.

[9] The heavy duty tire according to any one of [1] to [8] above, wherein an angle UE of the belt cords of the inner belt ply with respect to the equator plane of the tire is smaller than an angle SE of the belt cords of the outer belt ply with respect to the equator plane of the tire.

[10] The heavy duty tire according to any one of [1] to [8] above, wherein a cord density of the inner belt ply is higher than a cord density of the outer belt ply.

[11] The heavy duty tire according to any one of [1] to [10] above, wherein
the plurality of circumferential grooves demarcate a plurality of land portions aligned in the axial direction in the tread,
among the plurality of land portions, a land portion located on the equator plane of the tire or a land portion closest to the equator plane is a center land portion,
the center land portion has a transverse sipe traversing the center land portion,
the transverse sipe has a sipe body and a tubular portion located radially inward of the sipe body, and
the tubular portion has a groove width wider than a groove width of the sipe body.

What is claimed is:

1. A heavy duty tire having a nominal aspect ratio of not less than 70%, the tire comprising:
a pair of beads;
a carcass extending on and between the pair of beads;
a reinforcing layer located radially outward of the carcass; and
a tread covering the reinforcing layer and configured to come into contact with a road surface, wherein
the tread has a plurality of circumferential grooves extending continuously in a circumferential direction,
the plurality of circumferential grooves include a shoulder circumferential groove located on each outermost side in an axial direction, the reinforcing layer includes a belt including a large number of belt cords aligned with each other, and a band including a helically wound band cord, the belt includes an inner belt ply and an outer belt ply aligned in a radial direction, a direction of inclination of the belt cords included in the inner belt ply is opposite to a direction of inclination of the belt cords included in the outer belt ply, the band includes a full band located between the inner belt ply and the outer belt ply, ends of the inner belt ply, the outer belt ply, and the full band are located axially outward of the shoulder circumferential groove, a distance UFc between the full band and the inner belt ply is longer than a distance SFc between the full band and the outer belt ply at an equator plane of the tire, a ratio (UFc/SFc) of the distance UFc between the full band and the inner belt ply to the distance SFc between the full band and the outer belt ply at the equator plane of the tire is not less than 2.0, a cord density of the full band is not less than 22 ends/50 mm, and the band includes an edge band, and each narrow buffer layer is between the edge band and the outer belt ply.

2. The heavy duty tire according to claim 1, wherein the distance UFc between the full band and the inner belt ply at the equator plane of the tire is not less than 0.6 mm.

3. The heavy duty tire according to claim 1, wherein a distance UFs between the full band and the inner belt ply at the end of the full band is not greater than 2.5 mm.

4. The heavy duty tire according to claim 1, wherein the distance UFc between the full band and the inner belt ply at the equator plane of the tire is longer than a distance UFs between the full band and the inner belt ply at the end of the full band.

5. The heavy duty tire according to claim 4, wherein a ratio (UFc/SFc) is not less than 2.0 and not greater than 3.0.

6. The heavy duty tire according to claim 5, wherein a ratio of a cord density of the inner belt ply to a cord density of the outer belt ply is not less than 1.05 and not greater than 1.50.

7. The heavy duty tire according to claim 1, wherein a ratio of a cord density of the inner belt ply to a cord density of the full band is not less than 0.65.

8. The heavy duty tire according to claim 1, wherein an angle FU formed between the band cord of the full band and the belt cords of the inner belt ply is not less than 10 degrees and not greater than 25 degrees, and an angle FS formed between the band cord of the full band and the belt cords of the outer belt ply is not less than 10 degrees and not greater than 25 degrees.

9. The heavy duty tire according to claim 1, wherein an angle UE of the belt cords of the inner belt ply with respect to the equator plane of the tire is smaller than an angle SE of the belt cords of the outer belt ply with respect to the equator plane of the tire.

10. The heavy duty tire according to claim 1, wherein a cord density of the inner belt ply is higher than a cord density of the outer belt ply.

11. The heavy duty tire according to claim 1, wherein the plurality of circumferential grooves demarcate a plurality of land portions aligned in the axial direction in the tread, among the plurality of land portions, a land portion located on the equator plane of the tire or a land portion closest to the equator plane is a center land portion, the center land portion has a transverse sipe traversing the center land portion, the transverse sipe has a sipe body and a tubular portion located radially inward of the sipe body, and the tubular portion has a groove width wider than a groove width of the sipe body.

12. The heavy duty tire according to claim 1, wherein a ratio (SFs/SFc) of a distance SFs, which is a distance between the band cord and the belt cord of the outer belt ply closest to the end of the full band, to the distance SFc is not less than 0.95 and not greater than 1.05.

13. The heavy duty tire according to claim 1, wherein a ratio (UFc/UFs) of the distance UFc to a distance UFs between the full band and the inner belt ply at the end of the full band is not less than 1.05 and not greater than 1.50.

14. The heavy duty tire according to claim 1, wherein a wide buffer layer is located between the full band and the inner belt ply.

15. The heavy duty tire according to claim 1, wherein a ratio of a cord density of the inner belt ply to a cord density of the outer belt ply is not less than 1.05 and not greater than 1.50.

16. The heavy duty tire according to claim 15, wherein a ratio (UFc/UFs) of the distance UFc to a distance UFs between the full band and the inner belt ply at the end of the full band is not less than 1.05 and not greater than 1.50.

17. The heavy duty tire according to claim 16, wherein a ratio of a cord density of the inner belt ply to a cord density of the outer belt ply is not less than 1.05 and not greater than 1.50.

18. A heavy duty tire having a nominal aspect ratio of not less than 70%, the tire comprising:

a pair of beads;

a carcass extending on and between the pair of beads;

a reinforcing layer located radially outward of the carcass; and a tread covering the reinforcing layer and configured to come into contact with a road surface, wherein the tread has a plurality of circumferential grooves extending continuously in a circumferential direction, the plurality of circumferential grooves include a shoulder circumferential groove located on each outermost side in an axial direction, the reinforcing layer includes a belt including a large number of belt cords aligned with each other, and a band including a helically wound band cord, the belt includes an inner belt ply and an outer belt ply aligned in a radial direction, a direction of inclination of the belt cords included in the inner belt ply is opposite to a direction of inclination of the belt cords included in the outer belt ply, the band includes a full band located between the inner belt ply and the outer belt ply, ends of the inner belt ply, the outer belt ply, and the full band are located axially outward of the shoulder circumferential groove, a distance UFc between the full band and the inner belt ply is longer than a distance SFc between the full band and the outer belt ply at an equator plane of the tire, a wide buffer layer is located between the full band and the inner belt ply, and the band includes an edge band, and each narrow buffer layer is between the edge band and the outer belt ply.

\* \* \* \* \*